(12) United States Patent
Previty et al.

(10) Patent No.: US 8,551,270 B2
(45) Date of Patent: Oct. 8, 2013

(54) PRESSURE SENSITIVE SHRINK LABEL

(75) Inventors: Richard A. Previty, Chardon, OH (US); James Paul Lorence, Concord, OH (US); Richard D. Pastor, Chardon, OH (US); Craig William Potter, Mentor, OH (US); Mitchell J. Rackovan, Madison, OH (US); William Lewis Cone, Weeki Wachee, FL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 12/237,761

(22) Filed: Sep. 25, 2008

(65) Prior Publication Data
US 2009/0038737 A1    Feb. 12, 2009

Related U.S. Application Data

(63) Continuation-in-part of application No. PCT/US2008/059397, filed on Apr. 4, 2008.

(60) Provisional application No. 60/910,282, filed on Apr. 5, 2007, provisional application No. 60/938,019, filed on May 15, 2007.

(51) Int. Cl.
*B32B 37/14* (2006.01)

(52) U.S. Cl.
USPC .................. 156/86; 156/84; 156/85

(58) Field of Classification Search
USPC ................................. 156/84, 85, 86
See application file for complete search history.

(56) References Cited

U.S. PATENT DOCUMENTS

| | | | | |
|---|---|---|---|---|
| 5,240,529 A * | 8/1993 | Hoffman | ......................... | 156/86 |
| 5,512,120 A * | 4/1996 | Hinton et al. | ..................... | 156/215 |
| 5,879,496 A * | 3/1999 | Bright et al. | ..................... | 156/86 |
| 5,897,722 A * | 4/1999 | Bright | ............................ | 156/86 |
| 2002/0098303 A1* | 7/2002 | Rackovan et al. | ........... | 428/34.9 |
| 2009/0022916 A1* | 1/2009 | Yamada et al. | ............... | 428/34.9 |

FOREIGN PATENT DOCUMENTS

| | | |
|---|---|---|
| EP | 1810822 | 7/2007 |
| EP | 1839849 | 10/2007 |
| EP | 1862517 | 10/2007 |
| EP | 1876019 | 1/2008 |
| WO | WO 2006/051884 | 5/2006 |
| WO | WO 2006/075634 | 7/2006 |
| WO | WO 2006/109662 | 10/2006 |

* cited by examiner

*Primary Examiner* — Katarzyna Wyrozebski Lee
*Assistant Examiner* — Margaret Squalls
(74) *Attorney, Agent, or Firm* — Avery Dennison Corporation

(57) ABSTRACT

A label for application to a surface having at least one compound curve is provided. The label comprises a heat shrinkable film having an inner surface and outer surface and a layer of pressure sensitive adhesive on the inner surface of the heat shrinkable film.

20 Claims, 7 Drawing Sheets

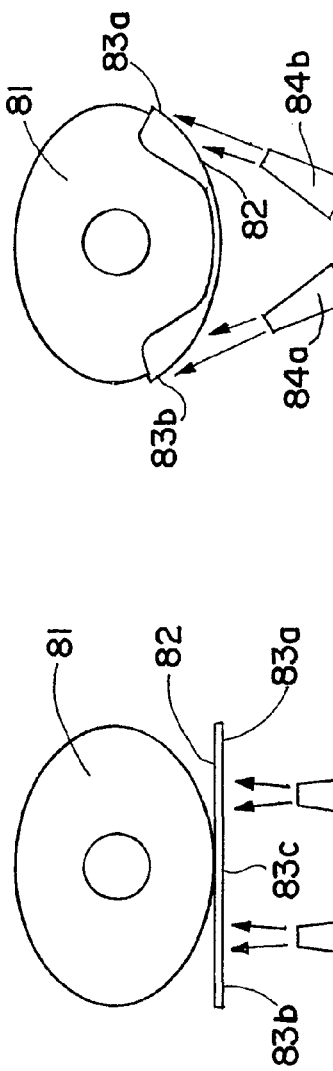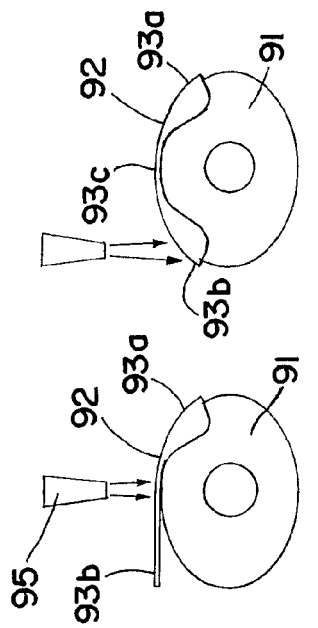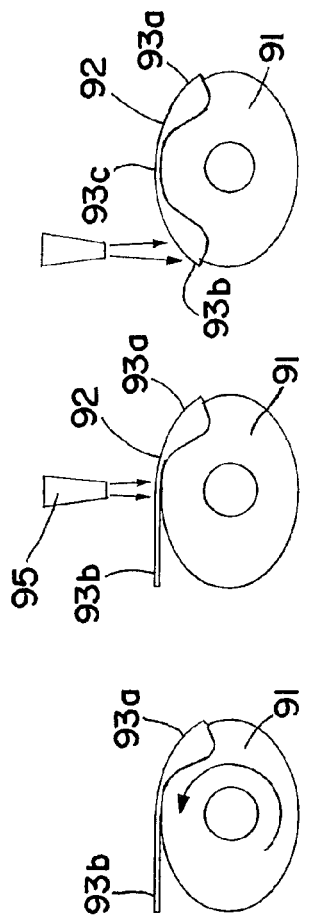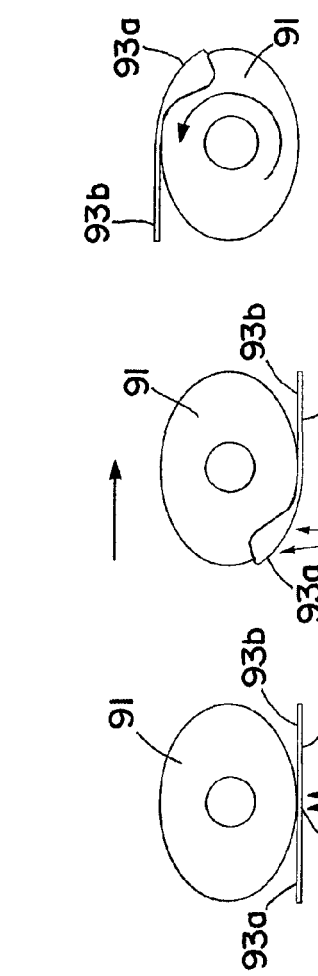

PRESSURE SENSITIVE SHRINK LABEL

CROSS REFERENCE TO RELATED APPLICATIONS

This application is a continuation-in-part of PCT/US08/59397 filed Apr. 4, 2008, which claims priority from provisional applications U.S. Ser. No. 60/910,282 filed Apr. 5, 2007 and U.S. Ser. No. 60/938,019 filed May 15, 2007, the entire disclosures of which are incorporated herein by reference, and is related to co-pending U.S. application Ser. No. 12/237,737 filed on Sep. 25, 2008.

TECHNICAL FIELD

This invention relates to pressure sensitive shrink labels. More specifically, the invention relates to pressure sensitive labels that have superior conformability to containers having complex shapes and methods for applying such labels.

BACKGROUND

It is common practice to apply labels to containers or bottles to provide information such as the supplier of the container or the contents of the container. Such containers and bottles are available in a wide variety of shapes and sizes for holding many different types of materials such as detergents, chemicals, personal care products, motor oil, beverages, etc.

Polymeric film materials and film facestocks have been described for use as labels in various fields. Polymeric labels are increasingly desired for many applications, particularly clear polymeric labels since they provide a no-label look to decorated glass and plastic containers. Paper labels block the visibility of the container and/or the contents in the container. Clear polymeric labels enhance the visual aesthetics of the container, and therefore the product, and are growing much faster than paper labels in the package decoration market as consumer product companies are continuously trying to upgrade the appearance of their products. Polymeric film labels also have superior mechanical properties, such as tensile strength and abrasion resistance.

Traditional pressure sensitive adhesive (PSA) labels often have difficulty adhering smoothly to containers having curved surfaces and/or complex shapes without wrinkling, darting or lifting on the curved surfaces. The label size of typical PSA labels is limited to no larger than ¼ inch away from the edge (beginning) of curvature of a container or article. Shrink sleeve labels have typically been used on these types of compound containers. Labeling operations are carried out using processes and methods that require the formation of a tube or sleeve of the heat shrink film that is placed over the container and heated in order to shrink the film to conform to the size and shape of the container. Alternatively, the containers are completely wrapped with a shrink label using a process wherein the shrink film is applied to the container directly from a continuous roll of film material and then heat is applied to conform the wrapped label to the container. However, label defects can occur during labeling operations of simple or compound shaped bottles during application or in post application processes. These misapplied labels result in high scrap or extra processing steps that can be costly.

The present invention provides a pressure sensitive adhesive label that can be applied to containers and articles on complex shapes and compound curves with less material required and less cost than for shrink sleeve or shrink wrap labels. In addition, the labels of the present invention enable the user to expand the billboard or graphics region of traditional pressure sensitive labels on containers and articles having complex shapes and/or compound curves.

SUMMARY

A label for application on a curved or nonplanar surface comprising a heat shrink film and a pressure sensitive adhesive is provided. In one embodiment, there is provided a pressure sensitive adhesive label for application on a surface having at least one compound curve, the label comprising: a heat shrinkable film having an inner surface and outer surface, and a machine direction and a transverse direction, the film having an ultimate shrinkage S in at least one direction of at least 10% at 90° C., wherein the shrinkage in the other direction is S±20%; and a layer of pressure sensitive adhesive on the inner surface of the heat shrinkable film. The shrink film has moderate and balanced shrink in both the machine direction and the transverse direction. In one embodiment, the film has an ultimate shrinkage S in at least one direction of at least 10% at 90° C., and the shrinkage in the other direction is S±10%. The label may further include a release liner removal adhered to the adhesive layer.

There is also provided an article bearing a label comprising: an article having a surface comprising at least one compound curve; and a pressure sensitive label comprising a heat shrinkable film having an inner surface and outer surface, and a layer of pressure sensitive adhesive on the inner surface of the heat shrinkable film, wherein the label is applied to at least one compound curve.

A method of applying a label to an article wherein the article has a surface having at least one compound curve is provided. The method comprises: (a) providing an article having a surface comprising at least one compound curve; (b) providing a label comprising (i) a heat shrinkable film having an inner surface and outer surface and (ii) a layer of pressure sensitive adhesive on the inner surface of the heat shrinkable film, wherein the label has a central portion and a peripheral portion; (c) contacting the adhesive layer of the central portion of the label with the article; (d) applying pressure to the label in an outward direction from the central portion to the peripheral portion, wherein at least a portion of the label is applied to at least one compound curve of the article; and (e) applying heat to at least a portion of the label to shrink at least that portion of the label and adhere the label to the article. After or during the application of heat, the label may be further compressed or wiped down to fully adhere the label to the article and eliminate any remaining defects in the label.

In one aspect of the invention, there is provided a method of applying a label to an article, the method including the steps of providing an article having a surface comprising at least one compound curve; providing a label comprising (i) a heat shrinkable film having an inner surface and an outer surface; and (ii) a layer of pressure sensitive adhesive on the inner surface of the heat shrinkable film, wherein the label has a first edge and a contact region; contacting the adhesive layer in the contact region of the label with the article; and applying heat and pressure simultaneously to the label in a direction from the contact region to the first edge such that the first edge of the label adheres to the article and the label shrinks to conform to the compound curve of the article, wherein the heat and pressure are applied by at least one hot air knife assembly comprising a source of heated air, a flow control mechanism and one or more hot air knife slots.

In one embodiment, the label includes a center and a second edge opposite the first edge, and the contact region is proximate to or in the center of the label. In another embodiment, the label includes a second edge opposite the first edge and the contact region is proximate to the second edge of the label.

Heat and pressure may be applied to the label by a hot air knife assembly that includes at least two hot air knife slots that rotate outwardly from the center of the label to the first and second edges to adhere the label to the article.

In one embodiment of the method of the present invention, a first hot air knife slot applies heat and pressure to the center of the label outwardly to the first edge of the label, and a second hot air knife slot applies heat and pressure to the center of the label outwardly to the second edge of the label. The article may be rotated about 180° prior to the application of heat and pressure by the second hot air knife slot to the label.

BRIEF DESCRIPTION OF DRAWINGS

FIGS. 8A and 8B are schematic views of an air knife assembly for simultaneously applying heat and pressure to a label.

FIGS. 9A-9E are schematic views of a process for applying a label to an article using multiple air knife slots.

DETAILED DESCRIPTION

Figure 1:
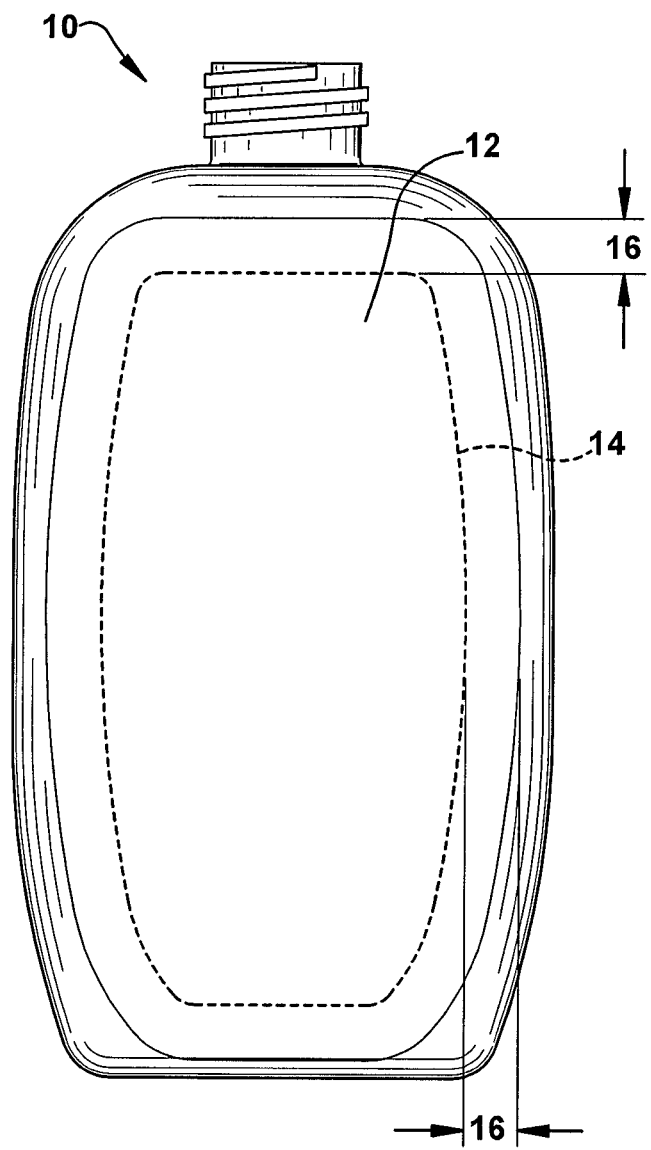
FIG. 1 illustrates a front view of a container to which the label of the present invention has been applied as compared to prior art pressure sensitive labels.

Pressure sensitive adhesive labels are provided that can improve the appearance of labeled containers and articles by conforming to the contours of the container or article and by providing an enlarged billboard appearance. End users and product designers must currently alter their designs to accommodate the limitations of traditional product decorating technologies. The labels of the present invention provide the designers with more freedom in product designs to create more shelf appeal and to carry more information.

Containers and articles with compound curves typically have to be fully wrapped with shrink film in order to label or decorate the article. The labels of the present invention are capable of expanding the label over complex curves without having to fully wrap the article. This partial label coverage impacts the product cost as well as the product appearance. Typical pressure sensitive labels cannot be applied to containers and articles without undesirable darting and wrinkling of the label. "Darting" is defined as the accumulation of excess label material that rises up away from the article to which the label is applied.

The labels of the present invention provide significant processing advantages over traditional shrink labels. For example, the pressure sensitive shrink labels of the present invention allow for more traditional printing and secondary processes such as foils and hot stamping. Where typical shrink labels must be subsurface printed, the labels of the present invention can be surface printed, which enhances the color quality, sharpness and texture of the printed image. The label film may be printed by water flexographic, UV flexographic, UV letterpress, UV screen, solvent gravure and hot foil stamp.

The pressure sensitive labels comprise (a) a heat shrinkable polymeric film having an inner surface and an outer surface and a machine direction and a transverse direction; and (b) a layer of pressure sensitive adhesive on the inner surface of the heat shrinkable film. The shrinkage of the heat shrinkable polymeric film is balanced in the machine direction and the transverse direction. In at least one direction, the ultimate shrinkage (S) is at least 10% at 90° C. and in the other direction, the shrinkage is S±20%. As an illustration of balanced shrinkage, if the shrinkage in the machine direction is 40% at 105° C., then the shrinkage in the transverse direction is 40%±20%, or within the range of 20% to 60% at 105° C. In one embodiment, the ultimate shrinkage (S) is at least 10% at 90° C. and in the other direction, the shrinkage is S±10%. As used herein, the term "ultimate shrinkage" means the maximum shrinkage the film is capable of achieving at a particular shrink temperature, as measured by ASTM Method D 1204.

The labels are not provided as a shrink sleeve or tube that encapsulates the entire article or as a shrink wrap label that wraps around the article and forms a seam wherein the ends of the label meet. The present labels may be provided in a variety of shapes to suit the article or container to which they are applied, giving the container designer greater latitude in container configuration and label design than with traditional pressure sensitive labels or with shrink wrap or shrink sleeve labels. The labels may be cut into the desired shape by any known method, including, for example, die cutting and laser cutting. In one embodiment, the label is die cut to a specific configuration that compensates for the shrinkage of the label and the shape of the article to which it is applied.

Because the label is conformable, the billboard or graphics area of the labeled container can be extended further onto the container edges and onto compound curved areas of the container. The label may be 10% to 30% larger than a standard PSA label. As used herein, the term "compound curve" means a surface having no direction for which there is no curvature. For example, the surface of a sphere or the surface of an ellipsoid has curvature in every direction, and therefore has compound curves. A cylinder, on the other hand, has a surface for which there is at least one direction for which there is no curvature. Thus, a simple cylinder does not have compound curves.

FIG. 1 illustrates the expanded billboard area of the pressure sensitive shrink label of the present invention. Bottle 10 has pressure sensitive shrink label 12 adhered thereto. The dashed line 14 indicates the outer boundary of standard pressure sensitive labels. A standard (i.e., non-shrink) pressure sensitive label cannot extend onto the areas of the bottle having the compound curves 16 (the area between the inner dashed line and the outer solid line). When label 12 is initially applied to the bottle 10, darts and pleats may form near the perimeter of the label in the areas of the bottle having compound curves 16.

Once the pressure sensitive label is applied to the container, heat is applied as needed to eliminate any label application defects such as darts, edge lift and wrinkles. In one embodiment, pressure and/or wipe down may be used in addition to the application of heat to eliminate any defects.

Figure 2B:
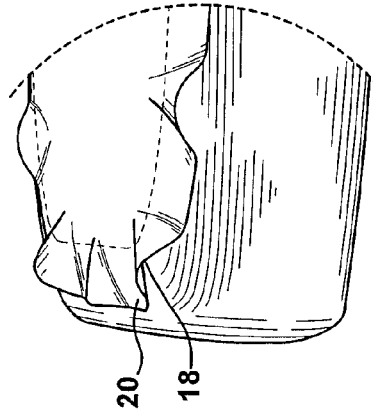
FIG. 2A to 2D illustrates the labeled container before and after the application of heat to the label.
Figure 2D:
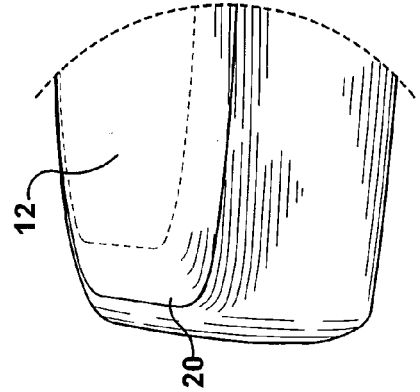
Figure 2A:
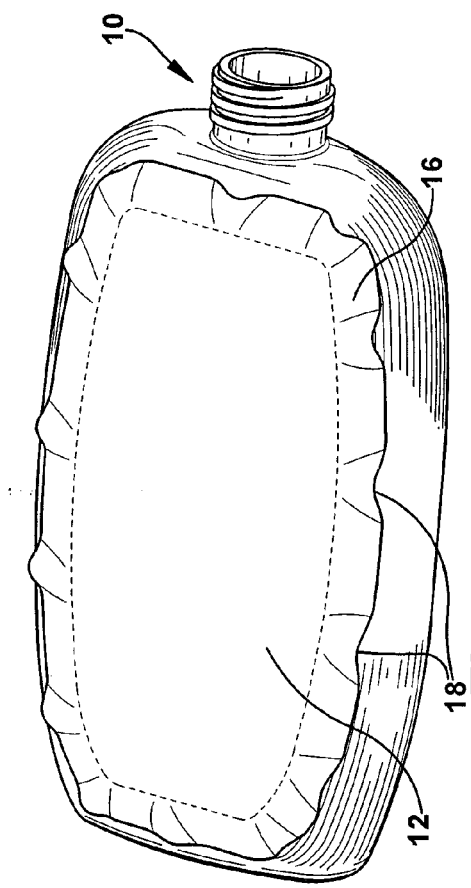
Figure 2C:
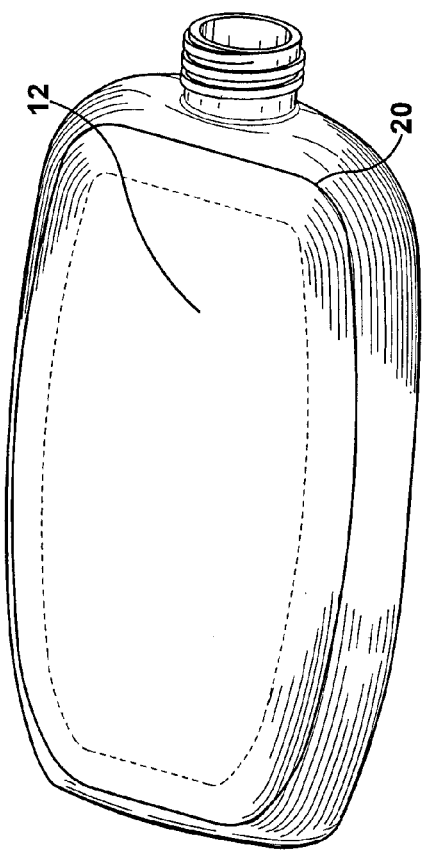

Referring to FIGS. 2A-2D, the present label and method for applying the label are illustrated. In FIGS. 2A and 2B, a label 12 that includes a shrink film having a continuous layer of pressure sensitive adhesive applied thereto is applied to a container 10 having compound curves around the circumference of the container, and then wiped down. No heat is applied to the label. The label 12 extends onto the compound curves 16 where darts 18 are formed near the perimeter 20 of the label. FIGS. 2C and 2D show the labeled container of FIGS. 2A-2B after heat is applied to the label. The darts 18 have been eliminated and the label 12 conforms to the compound curves of the container 10 near the label perimeter 20 without any defects.

The article or container to which the label is applied can be provided in a variety of forms or shapes. Non-limiting examples of suitable articles include containers with and without closures, trays, lids, toys, appliances, etc. The article or container may be made of any conventional polymer, glass, or metal such as aluminum. Examples of suitable polymeric materials include high density polyethylene (HDPE), low density polyethylene (LDPE), polyethylene terephthalate (PET), polypropylene (PP), polyvinyl chloride, polycarbonate, nylon, fluorinated ethylene propylene, polystyrene, etc. The article or container can be made by a number of various processes known in the art, such as blow molding, injection molding, thermoforming, rotational molding and the like.

Useful containers include, for example, a bottle having a closure on the top of the bottle, an upside down bottle having a closure on the bottom of the bottle, a bottle with a pump dispenser or a foaming dispenser, a tube with a closure and a bottle with a closure.

The container or article may have a transparent appearance. In one embodiment, the container or article has a translucent appearance. The translucent appearance can be achieved by, for example, treatments of the transparent container or article, the addition of ingredients such as dyes and pearlescent agents to base polymers, the use of polypropylene and/or polyethylene that are mixed with clarifying agents. The treatments include, for example, spray coating, sandblasting, and mold surface treatment.

The container or article may include aesthetic features, including, for example, textures, embossing, lenticular lens, colors, holograms, frosted or matte color, etc. The surface of the container or article may be treated prior to application of the label. For example, the surface of the container or article may be flame treated or a primer coating may be applied.

Figure 3A:
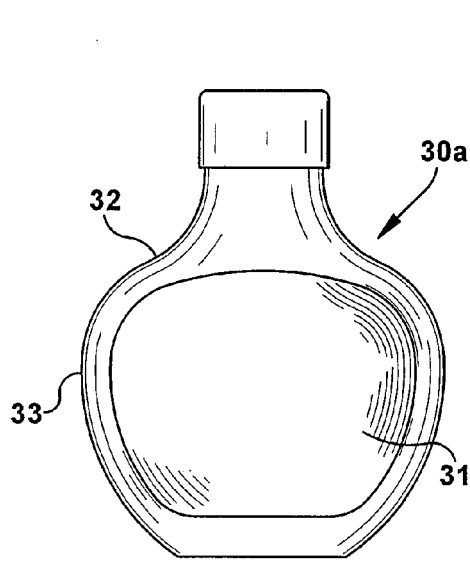
FIG. 3A to 3D illustrate embodiments of containers having complex shapes and compound curves to which the label of the present invention is applied.
Figure 3B:
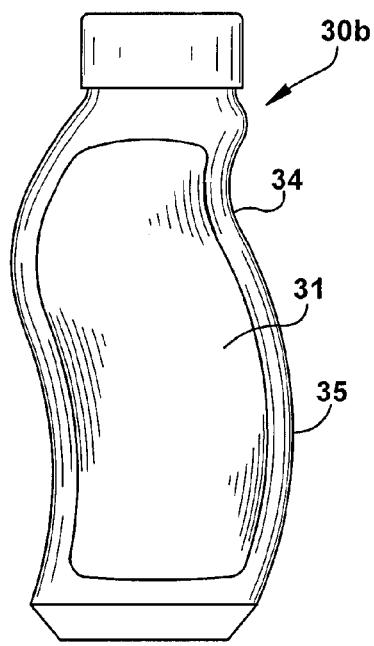
Figure 3C:
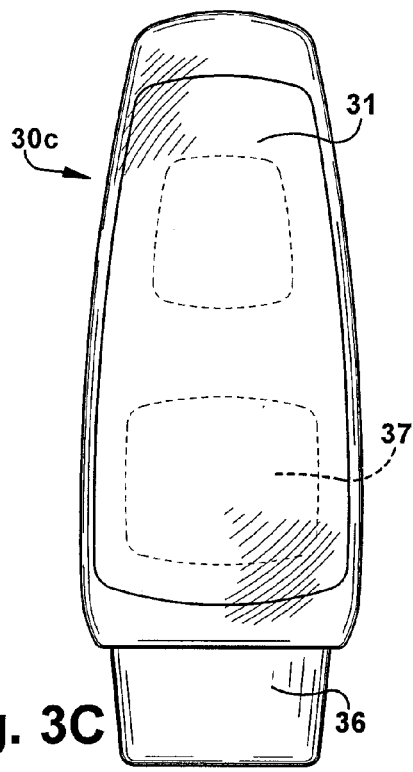
Figure 3D:
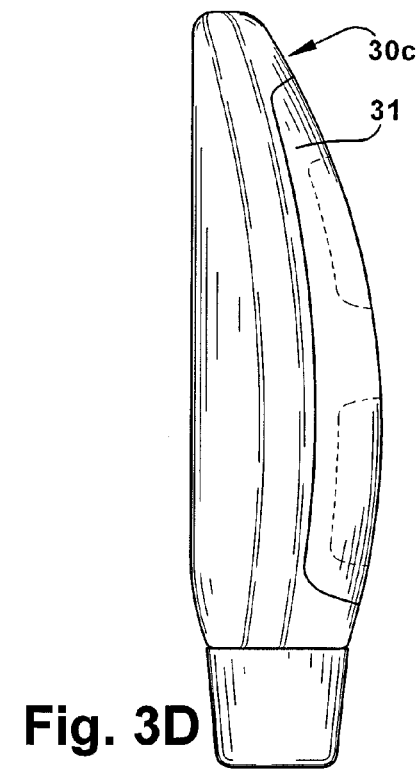

FIGS. 3A, 3B and 3C each illustrate a container having a complex shape and compound curves. FIG. 3A is a front view of a container 30a having a symmetrical, spherical shape wherein the container has a tapered concave area 32 at the top and a wider convex area 33 toward the bottom. Typically, a shrink sleeve would be used to provide a functional label for this container. With the present invention, a pressure sensitive shrink label 31 can be smoothly applied to container 30a without the appearance of label defects. FIG. 3B is a front view of a container 30b having an asymmetrical shape wherein one side of the container has both a concave area 34 and a convex area 35 and the opposing side curves in a substantially similar manner along the length of the container. The conventional method of labeling container 30b would be to apply a shrink sleeve label to conform to the complex shape of the container. A pressure sensitive shrink label 31 can be applied to the container 30b to provide sufficient billboard area with much less label material. FIG. 3C is a front view of a container 30c that is an upside down bottle having a closure 36 at the bottom and label 31 applied to the front surface. FIG. 3D is a side view of container 30c. The areas 37 within the dashed lines indicate the outer boundaries of standard pressure sensitive labels that can be applied to the container. The complex shape of this container requires two separate standard pressure sensitive labels to decorate the container, as the application of one continuous standard pressure sensitive label would result in the formation of darts and pleat defects. Pressure sensitive shrink label 31 can cover a much larger area, which provides more design options for the product designer.

Figure 4A:
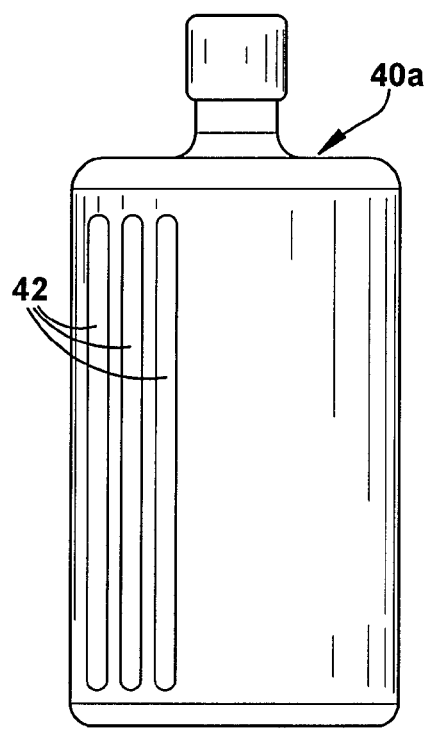
FIGS. 4A and 4B illustrate front views of embodiments of containers having irregular surfaces.
Figure 4B:
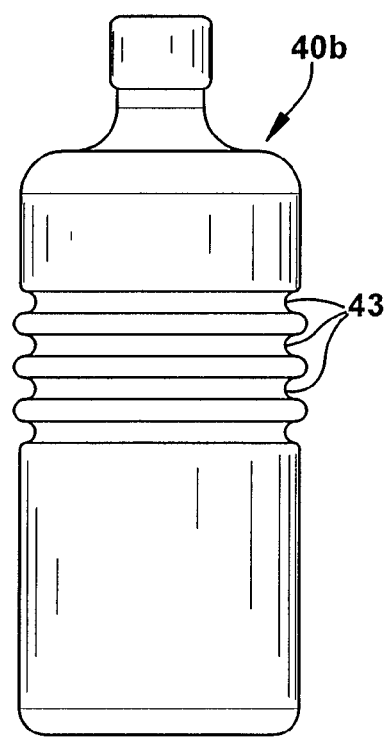

FIGS. 4A and 4B each illustrate a container having an irregular surface. FIG. 4A is a front view of a container 40a having raised ridges 42 along one side of the container. The opposing side of the container has a smooth surface. FIG. 4B is a front view of a container 40b having circumferentially recessed rings 43 along the length of the container. It should be noted that cylindrically shaped articles having areas of compound curves such as containers 40a and 40b are not excluded from the articles claimed herein.

Figure 5:
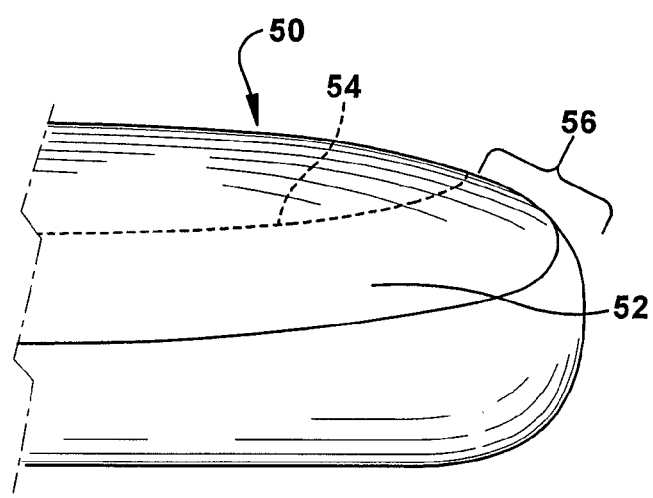
FIG. 5 is a three dimensional view of a portion of a labeled article having a compound curve.

FIG. 5 is a schematic three dimensional view of a portion of a container to which the label has been applied. The container 50 has surface comprising a compound curve. Label 52 is applied to the container and covers a portion of the compound curved area. Line 54 indicates the outer boundary to which typical pressure sensitive labels can be applied with out the formation of defects in the label. Area 56 indicates the expanded billboard area that is obtainable with the present labels without the formation of defects such wrinkles, edge lift or darts.

Shrink Film

The polymeric films useful in the label constructions of the present invention possess balanced shrink properties. The balanced shrink properties allow the film to tighten darts and wrinkles initially formed in the label when the label is applied over curved surfaces and allow the darts and wrinkles to be wiped down with minimal graphics distortion of the label. Films having unbalanced shrink, that is, films having a high degree of shrink in one direction and low to moderate shrink in the other direction are not particularly useful because while darts may be removed in one direction, in the other direction the formation of darts is exacerbated. Useful films having balanced shrink allow for a wider variety of label shapes to be applied to a wider variety of container shapes.

In one embodiment, the polymeric film has an ultimate shrinkage (S) as measured by ASTM procedure D1204 in at least one direction of at least 10% at 90° C. and in the other direction, the shrinkage is S±20%. In another embodiment, the film has an ultimate shrinkage (S) in at least one direction of about 10% to about 50% at 70° C. and in the other direction, the shrinkage is S±20%. In one embodiment, the ultimate shrinkage (S) is at least 10% at 90° C. and in the other direction, the shrinkage is S±10%. The shrink initiation temperature of the film, in one embodiment, is in the range of about 60° C. to about 80° C.

The shrink film must be thermally shrinkable and yet have sufficient stiffness to be dispensed using conventional labeling equipment and processes, including printing, die-cutting and label transfer. The stiffness of the film required depends on the size of the label, the speed of application and the labeling equipment being used. In one embodiment, the shrink film has a stiffness in the machine direction (MD) of at least 5 mN, as measured by the L&W Bending Resistance test. In one embodiment, the shrink film has a stiffness of at least 10 mN, or at least 20 mN. The stiffness of the shrink film is important for proper dispensing of labels over a peel plate at higher line speeds.

In one embodiment, the die-cut labels are applied to the article or container in an automated labeling line process at a line speed of at least 100 units per minute, or at least 250 units per minute or at least 500 units per minute.

In one embodiment, the shrink film has a 2% secant modulus as measured by ASTM D882 in the machine direction (MD) of about 20,000 to about 400,000 psi, and in the transverse (or cross) direction (TD) of about 20,000 to about 400,000 psi. In another embodiment, the 2% secant modulus of the film is about 30,000 to about 300,000 in the machine direction and about 30,000 to about 300,000 in the transverse direction. The film may have a lower modulus in the transverse direction than in the machine direction so that the label is easily dispensed (MD) while maintaining sufficiently low modulus in the TD for conformability and/or squeezability.

The polymeric film may be made by conventional processes. For example, the film may be produced using a double bubble process, tenter process or may comprise a blown film.

The shrink film useful in the label may be a single layer construction or a multilayer construction. The layer or layers of the shrink film may be formed from a polymer chosen from polyester, polyolefin, polyvinyl chloride, polystyrene, polylactic acid, copolymers and blends thereof.

Polyolefins comprise homopolymers or copolymers of olefins that are aliphatic hydrocarbons having one or more carbon to carbon double bonds. Olefins include alkenes that comprise 1-alkenes, also known as alpha-olefins, such as 1-butene and internal alkenes having the carbon to carbon double bond on nonterminal carbon atoms of the carbon chain, such as 2-butene, cyclic olefins having one or more carbon to carbon double bonds, such as cyclohexene and norbornadiene, and cyclic polyenes which are noncyclic aliphatic hydrocarbons having two or more carbon to carbon double bonds, such as 1,4-butadiene and isoprene. Polyolefins comprise alkene homopolymers from a single alkene monomer, such as a polypropylene homopolymer, alkene copolymers from at least one alkene monomer and one or more additional olefin monomers where the first listed alkene is the major constituent of the copolymer, such as a propylene-ethylene copolymer and a propylene-ethylene-butadiene copolymer, cyclic olefin homopolymers from a single cyclic olefin monomer, and cyclic olefin copolymers from at least one cyclic olefin monomer and one or more additional olefin monomers wherein the first listed cyclic olefin is the major constituent of the copolymer, and mixtures of any of the foregoing olefin polymers.

In one embodiment, the shrink film is a multilayer film comprising a core layer and at least one skin layer. The skin layer may be a printable skin layer. In one embodiment, the multilayer shrink film comprises a core and two skin layers, wherein in at least one skin layer is printable. The multilayer shrink film may be a coextruded film.

The film can range in thickness from 0.5-20, or 0.5-12, or 0.5-8, or 1-3 mils. The difference in the layers of the film can include a difference in thermoplastic polymer components, in additive components, in orientation, in thickness, or a combination thereof. The thickness of the core layer can be 50-95%, or 60-95% or 70-90% of the thickness of the film. The thickness of a skin layer or of a combination of two skin layers can be 5-50%, or 5-40% or 10-30% of the thickness of the film.

The film can be further treated on one surface or both the upper and lower surfaces to enhance performance in terms of printability or adhesion to an adhesive. The treatment can comprise applying a surface coating such as, for example, a lacquer, applying a high energy discharge to include a corona discharge to a surface, applying a flame treatment to a surface, or a combination of any of the foregoing treatments. In an embodiment of the invention, the film is treated on both surfaces, and in another embodiment the film is treated on one surface with a corona discharge and is flame treated on the other surface.

The layers of the shrink film may contain pigments, fillers, stabilizers, light protective agents or other suitable modifying agents if desired. The film may also contain anti-block, slip additives and anti-static agents. Useful anti-block agents include inorganic particles, such as clays, talc, calcium carbonate and glass. Slip additives useful in the present invention include polysiloxanes, waxes, fatty amides, fatty acids, metal soaps and particulate such as silica, synthetic amorphous silica and polytetrafluoroethylene powder. Anti-static agents useful in the present invention include alkali metal sulfonates, polyether-modified polydiorganosiloxanes, polyalkylphenylsiloxanes and tertiary amines.

In one embodiment, the shrink film is microperforated to allow trapped air to be released from the interface between the label and the article to which it is adhered. In another embodiment, the shrink film is permeable to allow fluid to escape from the adhesive or from the surface of the article to escape. In one embodiment, vent holes or slits are provided in the shrink film.

Adhesives

A description of useful pressure sensitive adhesives may be found in *Encyclopedia of Polymer Science and Engineering*, Vol. 13, Wiley-Interscience Publishers (New York, 1988). Additional description of useful PSAs may be found in *Polymer Science and Technology*, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. Hot melt adhesives may also be used. In one embodiment, the PSA comprises an acrylic emulsion adhesive.

The adhesive and the side of the film to which the adhesive is applied have sufficient compatibility to enable good adhesive anchorage. In one embodiment, the adhesive is chosen so that the labels may be cleanly removed from PET containers up to 24 hours after application. The adhesive is also chosen so that the adhesive components do not migrate into the film.

In one embodiment, the adhesive may be formed from an acrylic based polymer. It is contemplated that any acrylic based polymer capable of forming an adhesive layer with sufficient tack to adhere to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure-sensitive adhesive might be formed from a single polymeric species.

The glass transition temperature of a PSA layer comprising acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic based such as those taught in U.S. Pat. No. 5,164,444 (acrylic emulsion), U.S. Pat. No. 5,623,011 (tackified acrylic emulsion) and U.S. Pat. No. 6,306,982. The adhesive can also be rubber-based such as those taught in U.S. Pat. No. 5,705,551 (rubber hot melt). It can also be radiation curable mixture of monomers with initiators and other ingredients such as those taught in U.S. Pat. No. 5,232,958 (UV cured acrylic) and U.S. Pat. No. 5,232,958 (EB cured). The disclosures of these patents as they relate to acrylic adhesives are hereby incorporated by reference.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA comprises a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, and acrylic and methacrylic comonomers as described in U.S. Pat. No. 5,164,444 resulting in the latex particle size of about 0.2 microns in weight average diameters and a gel content of about 60%.

A commercial example of a hot melt adhesive is H2187-01, sold by Ato Findley, Inc., of Wauwatusa, Wis. In addition, rubber based block copolymer PSAs described in U.S. Pat. No. 3,239,478 also can be utilized in the adhesive constructions of the present invention, and this patent is hereby incorporated by a reference for its disclosure of such hot melt adhesives that are described more fully below.

In another embodiment, the pressure-sensitive adhesive comprises rubber based elastomer materials containing useful rubber based elastomer materials include linear, branched, grafted, or radial block copolymers represented by the diblock structure A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons that may be monocyclic or bicyclic in nature. Rubbery materials such as polyisoprene, polybutadiene, and styrene butadiene rubbers may be used to form the rubbery block or segment. Particularly useful rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes that may be utilized include any of those that exhibit elastomeric properties. The block copolymers may be diblock, triblock, multiblock, starblock, polyblock or graftblock copolymers. Throughout this specification, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in Block Copolymers, Science Technology, Dale J. Meier, Ed., Harwood Academic Publishers, 1979, at pages 1-5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2}$...BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc.

Many of the above-described copolymers of conjugated dienes and vinyl aromatic compounds are commercially available. The number average molecular weight of the block copolymers, prior to hydrogenation, is from about 20,000 to about 500,000, or from about 40,000 to about 300,000.

The average molecular weights of the individual blocks within the copolymers may vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000, or from about 35,000 to 150,000.

Also, prior to hydrogenation, the vinyl content of the conjugated diene portion generally is from about 10% to about 80%, or from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers LLC under the KRATON trade name.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Kraton Polymers under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

In another embodiment, the selectively hydrogenated block copolymer is of the formula:

$$B_n(AB)_oA_p$$

wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction of the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder.

Examples of commercially available maleated selectively hydrogenated copolymers of styrene and butadiene include Kraton FG1901X, FG1921X, and FG1924X, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Unsaturated elastomeric polymers and other polymers and copolymers which are not inherently tacky can be rendered tacky when compounded with an external tackifier. Tackifiers, are generally hydrocarbon resins, wood resins, rosins, rosin derivatives, and the like, which when present in concentrations ranging from about 40% to about 90% by weight of the total adhesive composition, or from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made in accordance with the instant invention.

It is contemplated that any tackifier known by those of skill in the art to be compatible with elastomeric polymer compositions may be used with the present embodiment of the invention. One such tackifier, found useful is Wingtak 10, a synthetic polyterpene resin that is liquid at room temperature, and sold by the Goodyear Tire and Rubber Company of Akron, Ohio. Wingtak 95 is a synthetic tackifier resin also available from Goodyear that comprises predominantly a polymer derived from piperylene and isoprene. Other suitable tackifying additives may include Escorez 1310, an aliphatic hydrocarbon resin, and Escorez 2596, a $C_5$-$C_9$ (aromatic modified aliphatic) resin, both manufactured by Exxon of Irving, Tex. Of course, as can be appreciated by those of skill in the art, a variety of different tackifying additives may be used to practice the present invention.

In addition to the tackifiers, other additives may be included in the PSAs to impart desired properties. For example, plasticizers may be included, and they are known to decrease the glass transition temperature of an adhesive composition containing elastomeric polymers. An example of a useful plasticizer is Shellflex 371, a naphthenic processing oil available from Shell Lubricants of Texas. Antioxidants also may be included on the adhesive compositions. Suitable antioxidants include Irgafos 168 and Irganox 565 available from Ciba-Geigy, Hawthorne, N.Y. Cutting agents such as waxes and surfactants also may be included in the adhesives.

The pressure sensitive adhesive may be applied from a solvent, emulsion or suspension, or as a hot melt. The adhesive may be applied to the inner surface of the shrink film by any known method. For example, the adhesive may be applied by die coating curtain coating, spraying, dipping, rolling, gravure or flexographic techniques. The adhesive may be applied to the shrink film in a continuous layer, a discontinuous layer or in a pattern. The pattern coated adhesive layer substantially covers the entire inner surface of the film. As used herein, "substantially covers" is intended to mean the pattern in continuous over the film surface, and is not intended to include adhesive applied only in a strip along the leading or trailing edges of the film or as a "spot weld" on the film.

In one embodiment, an adhesive deadener is applied to portions of the adhesive layer to allow the label to adhere to complex shaped articles. In one embodiment, non-adhesive material such as ink dots or microbeads are applied to at least a portion of the adhesive surface to allow the adhesive layer to slide on the surface of the article as the label is being applied and/or to allow air trapped at the interface between the label and the article to escape.

A single layer of adhesive may be used or multiple adhesive layers may be used. Depending on the shrink film used and the article or container to which the label is to be applied, it may be desirable to use a first adhesive layer adjacent to the shrink film and a second adhesive layer having a different composition on the surface to be applied to the article or container for sufficient tack, peel strength and shear strength.

In one embodiment, the pressure sensitive adhesive has sufficient shear or cohesive strength to prevent excessive shrink-back of the label where adhered to the article upon the action of heat after placement of the label on the article, sufficient peel strength to prevent the film from label from lifting from the article and sufficient tack or grab to enable adequate attachment of the label to the article during the labeling operation. In one embodiment, the adhesive moves with the label as the shrink film shrinks upon the application of heat. In another embodiment, the adhesive holds the label in position so that as the shrink film shrinks, the label does not move.

The heat shrinkable film may include other layers in addition to the monolayer or multilayer heat shrinkable polymeric film. In one embodiment, a metalized coating of a thin metal film is deposited on the surface of the polymeric film. The heat shrinkable film may also include a print layer on the polymer film. The print layer may be positioned between the heat shrink layer and the adhesive layer, or the print layer may be on the outer surface of the shrink layer. In one embodiment, the film is reverse printed with a design, image or text so that the print side of the skin is in direct contact with the container to which the film is applied. In this embodiment, the film is transparent.

The labels of the present invention may also contain a layer of an ink-receptive composition that enhances the printability of the polymeric shrink layer or metal layer if present, and the quality of the print layer thus obtained. A variety of such compositions are known in the art, and these compositions generally include a binder and a pigment, such as silica or talc, dispersed in the binder. The presence of the pigment decreases the drying time of some inks. Such ink-receptive compositions are described in U.S. Pat. No. 6,153,288 (Shih et al) and the disclosure of this patent is hereby incorporated by reference.

The print layer may be an ink or graphics layer, and the print layer may be a mono-colored or multi-colored print layer depending on the printed message and/or the intended pictorial design. These include variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer may be formed in the conventional manner by, for example, gravure, flexographic or UV flexographic printing or the like, an ink composition comprising a resin of the type described above, a suitable pigment or dye and one or more suitable volatile solvents onto one or more desired areas of the film. After application of the ink composition, the volatile solvent component(s) of the ink composition evaporate(s), leaving only the non-volatile ink components to form the print layer.

The adhesion of the ink to the surface of the polymeric shrink film or metal layer if present can be improved, if necessary, by techniques well known to those skilled in the art. For example, as mentioned above, an ink primer or other ink adhesion promoter can be applied to the metal layer or the polymeric film layer before application of the ink. Alternatively the surface of the polymeric film can be corona treated or flame treated to improve the adhesion of the ink to the polymeric film layer.

Useful ink primers may be transparent or opaque and the primers may be solvent based or water-based. In one embodiment, the primers are radiation curable (e.g., UV). The ink primer may comprise a lacquer and a diluent. The lacquer may be comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. The ink primer layer may have a thickness of from about 1 to about 4 microns or from about 1.5 to about 3 microns.

A transparent polymer protective topcoat or overcoat layer may be present in the labels of the invention. The protective topcoat or overcoat layer provide desirable properties to the label before and after the label is affixed to a substrate such as a container. The presence of a transparent topcoat layer over the print layer may, in some embodiments provide additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g, UV), chemically resistant, thermally resistant thereby protecting the label and, particularly the print layer from degradation from such causes. The protective overcoat may also contain antistatic agents, or anti-block agents to provide for easier handling when the labels are being applied to containers at high speeds. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 12.5 to about 125 microns, and in one embodiment about 25 to about 75 microns. Examples of the topcoat layers are described in U.S. Pat. No. 6,106,982 which is incorporated herein by reference.

The protective layer may comprise polyolefins, thermoplastic polymers of ethylene and propylene, polyesters, polyurethanes, polyacryls, polymethacryls, epoxy, vinyl acetate homopolymers, co- or terpolymers, ionomers, and mixtures thereof.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin. 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidinethanol); Tinuvin 770 (bis-(2,2,6,6-tetramethyl-4-piperidinyl)-sebacate); and Tinuvin 783. Additional light stabilizers include the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

A release liner may be adhered to the adhesive layer to protect the adhesive layer during transport, storage and handling prior to application of the label to a substrate. The liner allows for efficient handling of an array of individual labels after the labels are die cut and the matrix is stripped from the layer of facestock material and up to the point where the individual labels are dispensed in sequence on a labeling line. The release liner may have an embossed surface and/or have non-adhesive material, such as microbeads or printed ink dots, applied to the surface of the liner.

Process

The process of applying the labels to articles or containers involves non-traditional operations and equipment. The process begins with traditional dispensing equipment that separates the label from the release liner via a peel plate or tip that presents the label with exposed adhesive to the container or article to be decorated. Referring to FIGS. 6A to 6D, the label 62, which has a central portion 61 and a peripheral portion 63 surrounding the central portion and having an outer boundary defined by the label edges, is contacted to the container 60 initially by applying pressure to the label in the central portion. Having the initial tack point(s) 64 located in a more central portion of the label rather than on the leading edge or peripheral portion of the label facilitates a more even distribution of any darts or wrinkles formed between the leading and trailing edges of the applied label. This in turn facilitates removal of the darts or wrinkles with the application of heat.

For those articles having both compound curves and relatively planar regions, the label may be initially contacted with the container not on a compound curve, but closer to or within a relatively planar area of the container surface.

In one embodiment, the label is pre-heated to soften the shrink film and/or activate the adhesive layer.

Figure 6A:
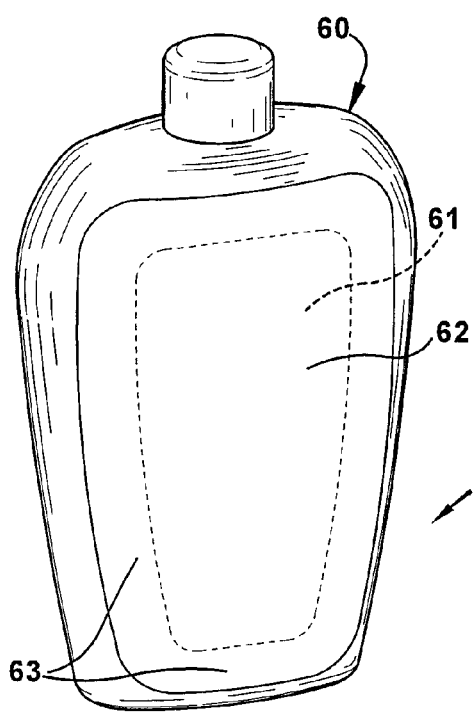
FIGS. 6A-6D schematically illustrate the process of applying the label to an article having a compound curve.
Figure 6B:
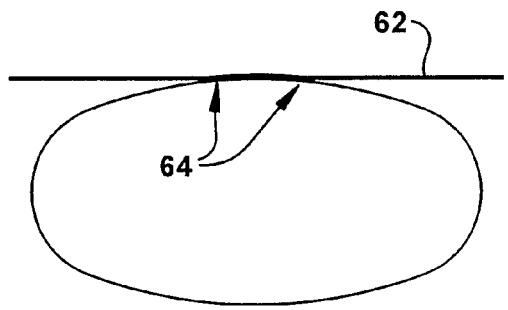
Figure 6C:
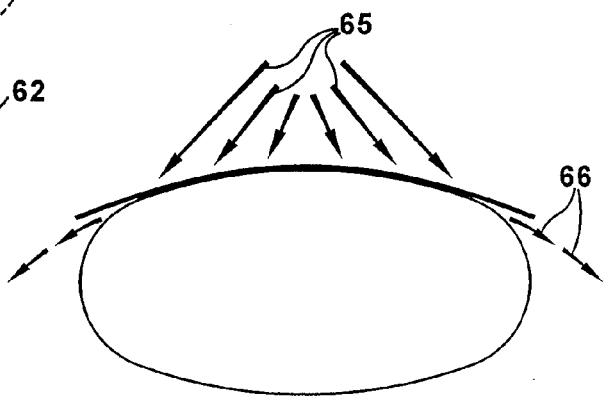
Figure 6D:
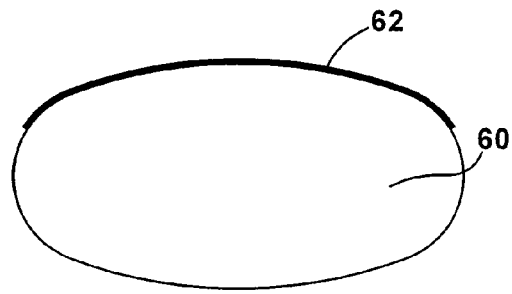

Pressure is applied to the transferred label with a series of brushes, rollers, wipers, squeegees, pneumatic rollers, or walking beam in a center outward direction, as indicated by arrows 65, to obtain intimate contact between the label and the container or article. This process is referred to herein as "wipe down" of the label. The center to edge wiping motion forces any air trapped beneath the label to the outer edges, as indicated by arrows 66, and creates smaller, more evenly distributed darts at the edges of the label. As the label covers the complex curves of the article, excess label material accumulates in the form of darts, pleats, channeling, bubbling and other application defects generally in the peripheral portion of the label. Heat is applied to at least a portion of the label to fully and smoothly adhere the label to the container as shown in FIG. 6D.

Figure 7A:
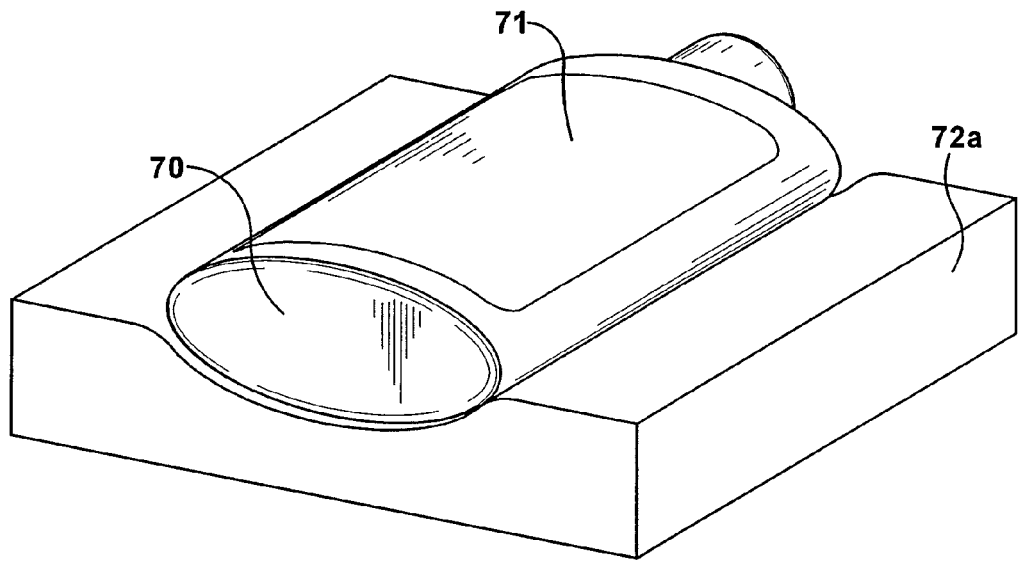
FIGS. 7A and 7B schematically illustrate an embodiment of the process of applying a label to an article wherein a walking beam is used.
Figure 7B:
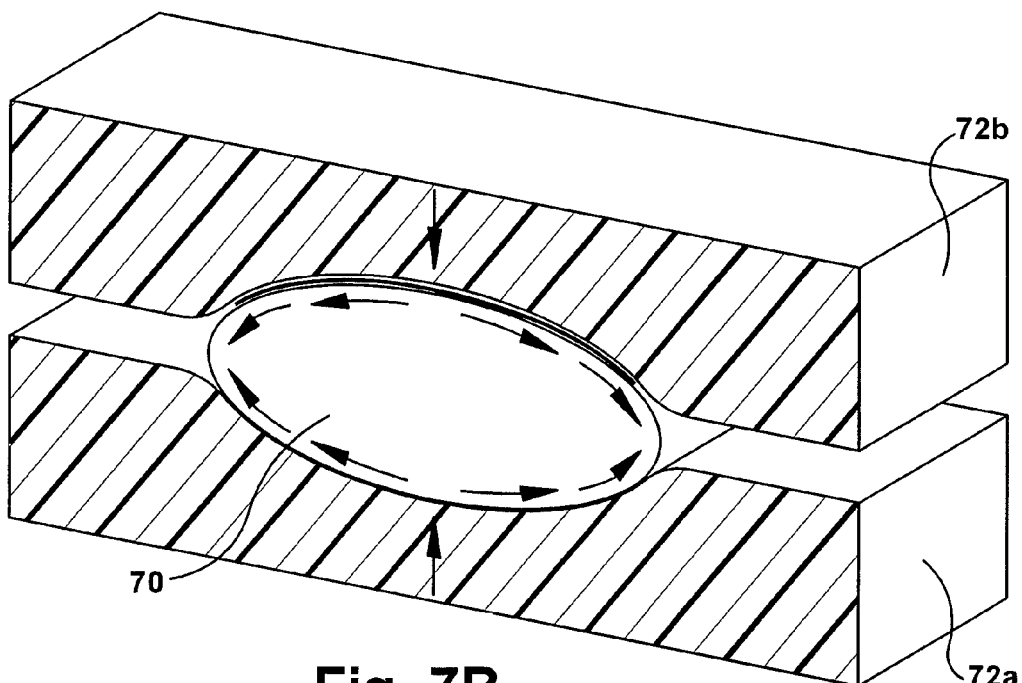

In one embodiment, pressure is applied to the label using a walking beam system equipped with a foam roller or foam covered beam. The foam roller or beam applies downward pressure in the longitudinal direction to the central region of the label and then proceeds to the outer edges of the label, directing any air trapped under the label and the pleats, wrinkles and/or other defects to the outer edges of the label. This embodiment is illustrated in FIG. 7, wherein container 70 having label 71 applied thereto, is positioned on lower foam block 72a of a walking beam. Upper foam block 72b applies downward pressure onto label 71 on container 70 to push air from under the central portion of the label to the periphery of the label as label and container are compressed between the foam blocks of the walking beam.

Once the label is applied and initial wipe down is completed, the excess label material darts and defects are eliminated by heating at least a portion the label to shrink the darts and/or wrinkles. The label may be heated via passage through a heat tunnel, forced air, steam tunnel, direct contact heat pads or forms. In one embodiment, the label is heated to a temperature of at least 40° C. In one embodiment, the label is heated to at least 60° C., or at least 70° C., or at least 80° C.

A subsequent wipe down of the label may be performed to eliminate any remaining darts or wrinkles in the label. Pressure is again applied to the label in a center outward direction to the label. The second wipe down can be performed by a series of rollers, wipers, squeegees, brushes, pneumatic rollers or a walking beam. The subsequent wipe down may be performed concurrently with the application of heat to the label, or subsequent to the application of heat.

When applying the label to an article or container, the label may be initially tacked to the article by applying pressure in a contact region of the label, and then applying pressure across the label in a direction to a first edge of the label. The contact region may be in the center of the label or may be proximate to a second edge of the label opposite to the first edge. For example, initial contact may be made in the center of the label and then pressure is applied in an outward direction to the edges or periphery of the label. Alternatively, initial contact may be made near one edge of the label and then pressure applied across the label to the opposite edge of the label. When applying the label to the article or container, it is desirable to move the excess label material, i.e., the darts or wrinkles, to at least one label edge. The excess material is typically moved in the direction of the compound curve(s), where the heat applied to the label will shrink the label and allow it to conform to the compound curve and eliminate any darts or wrinkles formed. Heat and pressure may be applied to the label simultaneously.

In one embodiment of the invention, the method of applying a label to an article includes the steps of: providing an article having a surface including at least one compound curve; providing a label including (i) a heat shrinkable film having an inner surface and an outer surface; and (ii) a layer of pressure sensitive adhesive on the inner surface of the heat shrinkable film, wherein the label has a first edge and a contact region; contacting the adhesive layer in the contact region with the article; and applying heat and pressure simultaneously to the label in a direction from the contact region to the first edge such that the first edge of the label adheres to article and the label shrinks to conform to the compound curve of the article, wherein the heat and pressure are applied by at least one hot air knife assembly including a source of heated air, a flow control mechanism and one or more hot air knife slots. The contact region may be located in or near the center of the label. Alternatively, the contact region may be proximate to a second edge of the label opposite the first edge.

FIG. 8 illustrates an embodiment of the invention wherein a hot air knife assembly is used to apply the label to the article or container. A label may be applied to one or both sides of the container. For the sake of simplicity of illustration, a label is applied only to one surface of the container of FIG. 8. The hot air knife assembly includes a source of hot air, a flow control mechanism and one or more hot air knife slots. As shown in FIG. 8A, two hot air knife slots 84a, 84b direct hot air at a high velocity to the center region 83c of the label 82. The label 82 is first applied to the center region 83c of the container 81 with a standard peel-tip dispensing process (not shown) with the leading edge (first edge 83a) and trailing edge (second edge 83b) not tacked down. The container with the label tacked thereto is transported to the air knife assembly via a conveyor.

Depending on the size and configuration of the container, additional hot air knife slots and/or hot air assemblies may be used to apply heat and pressure to the label. As shown in FIG. 8B, the hot air knifes 84a, 84b are rotated outwardly to direct hot air from the center region of the label 83c to the first edge 83a and second edge 83b of the label 82. As the hot air is forced against the label 82, the air between the label and the container 81 is pushed to the edges 83a, 83b of the label to smooth the label and eliminate or reduce air bubbles under the label. The hot air directed at the label 82 softens the label and shrinks the label. The simultaneous application of heat and pressure from the air knife slots 84a, 84b to the label forces the label 82 to conform to the surface of the container 81, including the compound curve(s) of the container. An optional subsequent heating step may be used to further shrink the label. An advantage of this method is that there is no direct contact with the label so that surface imperfections are not likely to be imparted to the label. An advantage is the ability to obtain high speed processing due to the excellent heat transfer to the label and the continuous heat recovery of the air knife assembly. This method may be used to apply labels to a variety of container and article shapes without the need for re-tooling.

FIG. 9 illustrates an embodiment wherein multiple air knife slots and/or air knife assemblies are used to apply a label to a container or article in a sequence of steps. A label may be applied to one or both sides of the container. For the sake of simplicity of illustration, a label is applied only to one surface of the container of FIG. 9. The hot air knife assembly includes a source of hot air, a flow control mechanism and one or more hot air knife slots. In an initial stage shown in 9A, a hot air knife slot 94 directs hot air at a high velocity to the center region 93c of the label 92. The label 92 is first applied to the center region 93c of the container 91 with a standard peel-tip dispensing process (not shown) with the leading edge (first edge 93a) and trailing edge (second edge 93b) not tacked down. The container with the label tacked thereto is transported to the air knife assembly via a conveyor. As shown in 9B, as the container 91 is transported by conveyor past the air knife slot 94, hot air is forced against the label 92 to the first edge 93a of the label, heating the label and causing it to conform to the surface of the container 91, while second edge 93b not conformed and/or tacked down. The container is then rotated about 180° as shown in 9C. As shown in 9D, the container 91 with the label 92 adhered thereto is then transported to a second hot air slot 95 that forces hot air against the label 92 from the center 93c to the second edge 93b of the label, heating the label and causing it to conform to the surface of the container 91 as shown in 9E. Depending on the size and configuration of the container, additional hot air knife slots and/or hot air assemblies may be used to apply heat and pressure to the label. An optional subsequent heating step may be used to further shrink the label.

The labeled article of the present invention may be used in a variety of applications, including, but not limited to personal care products, household chemical products, food and beverages, toys, electronics, pharmaceuticals, health care products, industrial products and appliances.

EXAMPLES

The following examples are intended only to illustrate methods and embodiments in accordance with the invention, and as such should not be construed as imposing limitations upon the claims.

Example 1

A pressure sensitive shrink label is constructed from a 3 mil thick low density polyethylene multilayer shrink film designated CorrTuff from Sealed Air. The film is coated with an acrylic emulsion adhesive S692N from Avery Dennison. The adhesive is carried on a paper Glassine BG-40 silicone coated release liner. The label is oversized, having the dimensions of approximately 5×3.5 inches, which is 20% greater than the industry standard recommended label size for the bottle to which the label is applied.

A 15 oz Johnson & Johnson Baby Lotion bottle having compound curves is filled with water, capped and processed through a Label-Aire 9000 series labeler at 100 bottles per minute (BPM). The labeler has dual-feed screws with matched speed top and lower belts with Label-Aire 2115-CD labeler heads with high torque stepper motor drive. The labels are pressed down with a walking beam type wipe down apparatus providing straight out, center outward forces to direct the trapped air beneath the label and resultant dart/pleat defects to the edge of the label. The oversized label as applied to the bottle initially results in unacceptable small darts and pleat defects around the perimeter of the label. The labeled bottle is then processed through a Leister hot forced air, conveyor wipe down system at 100 bpm. High velocity 260° C. hot air heats the bottle and label to 50° C., shrinking and taking up the excess label material darts and pleats down to the bottle surface. The label is wiped down with a walking beam for good label contact. The darts shrink and are easily wiped flat after application of heat.

The finished labeled bottle with larger label area and larger graphics content is smoothly wiped down without the darts, pleats, ridges or wrinkle defects present in typical pressure sensitive oversized labels. The darts do not return upon aging. Table 1 below shows the properties of the label components.

Example 2

In accordance with the process described in Example 1, a pressure sensitive shrink label constructed from a 2 mil thick polypropylene multilayer shrink film designated CZPA 200 from Innovia is applied to the bottle having compound curves. After initial wipe down, medium sized darts are formed. High velocity hot air heats the bottle and label to 100° C. The darts shrink and are easily wiped flat after application of heat. The darts do not return after aging.

Example 3

In accordance with the process described in Example 1, a pressure sensitive shrink label constructed from a 2 mil thick polylactic acid single layer shrink film designated EARTH-FIRST PLA from Plastic Suppliers is applied to the bottle having compound curves. After initial wipe down, medium sized darts are formed. High velocity hot air heats the bottle and label to 70° C. The darts shrink and are easily wiped flat after application of heat. The darts do not return after aging.

Comparative Example 4

In accordance with the process described in Example 1, a pressure sensitive shrink label constructed from a 2 mil thick machine direction oriented polypropylene single layer roll-on-shrink-on film from Avery Dennison is applied to the bottle having compound curves. High velocity hot air heats the bottle and label to 70° C. The darts formed at the top and bottom of the label shrink upon application of heat and are easily wiped down, while the darts formed at the leading and trailing edges remain. The removed darts do not return upon aging.

Comparative Example 5

In accordance with the process described in Example 1, a pressure sensitive shrink label constructed from a 1.9 mil thick transverse direction oriented polyvinyl chloride single layer film designated Penta Label from Kloeckner is applied to the bottle having compound curves. High velocity hot air heats the bottle and label to 60° C. The darts formed at the leading and trailing edges of the label shrink upon application of heat and are easily wiped down, while the darts formed at the top and bottom of the label remain. The removed darts do not return upon aging.

Comparative Example 6

In accordance with the process described in Example 1, a pressure sensitive shrink label constructed from a 2 mil thick transverse direction oriented glycol modified polyethylene terephthalate (PETG) single layer film designated Fusion 1775E from Mitsubishi is applied to the bottle having compound curves. High velocity hot air heats the bottle and label to 50° C. The darts formed at the leading and trailing edges of the label shrink upon application of heat and are easily wiped down, while the darts formed at the top and bottom of the label remain. The removed darts do not return upon aging.

Comparative Example 7

In accordance with the process described in Example 1, a pressure sensitive shrink label constructed from a 1.4 mil thick machine direction oriented polyvinyl chloride single layer film designated MF-L243/01 from Kloechner is applied to the bottle having compound curves. High velocity hot air heats the bottle and label to 60° C. The film does not conform to the container. Initial wipe down is poor with many darts formed in all directions. The darts and ridges remain after the application of heat and a second wipe down. The film exhibits excessive shrink back.

Comparative Example 8

In accordance with the process described in Example 1, a pressure sensitive shrink label constructed from a 2.0 mil thick polypropylene multilayer film designated BTNY from Vifan is applied to the bottle having compound curves. High velocity hot air heats the bottle and label to 100° C. The darts formed do not shrink completely at high temperature and do not entirely wipe down flat. The darts return upon aging.

Comparative Example 9

In accordance with the process described in Example 1, a pressure sensitive shrink label constructed from a 3.4 mil thick medium density polyethylene (MDPE) multilayer film designated PE 85 from Charter Films is applied to the bottle having compound curves. High velocity hot air heats the bottle and label to 100° C. The darts formed do not shrink completely at high temperature and do not entirely wipe down flat. The darts return upon aging.

TABLE 1

| Ex. | Grade | Polymer | Film Construction | Process | Suppliers | Gauge | Ult Tensile (PSI) |
|---|---|---|---|---|---|---|---|
| 1 | CorrTuff | LDPE | single layer | double bubble | Sealed Air | 3.0 | 10,000 MD 20,000 CD |
| 2 | CZPA 200 | PP | multi-layer | double bubble | Innovia | 2.0 | 20,000 MD 22,000 CD |
| 3 | EARTHFIRST PLA | Poly Lactic Acid | single layer | blown | Plastic Suppliers | 2.0 | 8,000 MD 8,000 CD |
| Comp. 4 | Med Shrink ROSO Film | PP | single layer | MDO | Avery PPD | 2.0 | — |
| Comp. 5 | Penta Label 2.0 mil OT-M276/41, 71/9400, GLGL | PVC | single layer | TDO | Kloeckner | 1.9 | 7,200 MD 16,900 CD |
| Comp. 6 | Fusion 2.0 mil 1775E | PETG | single layer | TDO | Mitsubishi | 2.0 | 7,250 MD 29,000 CD |
| Comp. 7 | MF-L243/01 WHT 03/402-B | PVC | single layer | MDO | Kloechner | 1.4 | — |
| Comp. 8 | BTNY | PP | multi-layer | tenter | Vifan | 2.0 | 40,000 MD 20,000 CD |
| Comp. 9 | PE 85 | MDPE | multi-layer | blown | Charter Films | 3.4 | 3,000 MD 3,500 CD |

| Ex. | Modulus (PSI) | L&W Stiffness (mN) | Shrink: MD | Shrink: TD | Adhesive | Liner |
|---|---|---|---|---|---|---|
| 1 | 30,000 MD 30,000 CD | 26 MD 24 CD | 40% (106 C.) 70% (120 C.) | 49% (106 C.) 69% (120 C.) | S692N | BG40 glassine |
| 2 | 100,000 MD 130,000 CD | 24 MD 18 CD | 10% (106 C.) 14% (120 C.) | 0% (106 C.) 10% (120 C.) | S692N | 1.2 mil PET |
| 3 | 300,000 MD 300,000 CD | 44 MD 60 CD | 7% (106 C.) 8% (120 C.) | 12% (106 C.) 14% (120 C.) | S692N | 1.2 mil PET |
| Comp. 4 | 200,000 MD 123,000 CD | 30 MD 26 CD | 14% (106 C.) 23% (120 C.) | 0% (106 C.) 0% (120 C.) | S692N | 1.2 mil PET |
| Comp. 5 | — | 52 MD 36 CD | 4% (106 C.) | 56% (106 C.) | S692N | BG40 glassine |
| Comp. 6 | — | 70 MD 30 CD | 6% (106 C.) | 66% (106 C.) | S692N | BG40 glassine |
| Comp. 7 | 220,000 MD 150,000 CD | — | 41% (106 C.) 45% (120 C.) | 0% (106 C.) +3% (120 C.) | S3506 | 1.2 mil PET |
| Comp. 8 | — | 35 MD 65 CD | 2% (106 C.) 2% (120 C.) | 0% (106 C.) 2% (120 C.) | S692N | BG40 glassine |
| Comp. 9 | 75,000 MD 60,000 CD | 40 MD 50 CD | 0% (106 C.) 4% (120 C.) | 0% (106 C.) 0% (120 C.) | S692N | BG40 glassine |

While the invention has been explained in relation to its preferred embodiments, it is to be understood that various modifications thereof will become apparent to those skilled in the art upon reading the specification. Therefore, it is to be under stood that the invention disclosed herein is intended to cover such modifications as fall within the scope of the appended claims.

What is claimed is:

1. A method of applying a label to an article, the method comprising:
providing an article having a surface comprising at least one compound curve;
providing a label comprising (i) a heat shrinkable film having an inner surface and an outer surface and (ii) a continuous layer of pressure sensitive adhesive on the inner surface of the heat shrinkable film, wherein the continuous layer of pressure sensitive adhesive substantially covers the entire inner surface of the heat shrinkable film and wherein the label has a first edge and a contact region;
contacting the adhesive layer in the contact region of the label with the article; and
applying heat and pressure simultaneously to the label in a direction from the contact region to the first edge such that the first edge of the label adheres to the article and the label shrinks biaxially to conform to the compound curve of the article wherein the label extends over the at least one compound curve without fully wrapping around the article, wherein the heat and pressure are applied by at least one hot air knife assembly comprising a source of heated air, a flow control mechanism, and one or more hot air knife slots.

2. The method of claim 1 wherein the label comprises a center and a second edge opposite the first edge, and the contact region is proximate to or in the center of the label.

3. The method of claim 1 wherein the label comprises a second edge opposite the first edge and the contact region is proximate to the second edge of the label.

4. The method of claim 2 wherein the hot air knife assembly comprises at least two hot air knife slots that rotate outwardly from the center of the label to the first and second edges to adhere the label to the article.

5. The method of claim 2 wherein a first hot air knife slot applies heat and pressure from the center of the label to the first edge of the label, and a second hot air knife slot applies heat and pressure from the center of the label to the second edge of the label.

6. The method of claim 5 further comprising rotating the article about 180° prior to the application of heat and pressure by the second hot air knife slot to the label.

7. The method of claim 1 wherein the label is provided with a release liner adhered to the adhesive layer and the method further comprises separating the release liner from the label prior to contacting the label with the article.

8. The method of claim 1 wherein the label is heated to a temperature of at least 40° C.

9. The method of claim 1 wherein the heat shrinkable film comprises a film selected from polyester, polyolefin, polyvinyl chloride, polystyrene, poly lactic acid, copolymers thereof and blends thereof.

10. The method of claim 1 wherein the heat shrinkable film comprises a polyolefin.

11. The method of claim 1 wherein the heat shrinkable film is a multilayer film having a core layer and at least one skin layer.

12. The method of claim 1 wherein the stiffness of the film is at least 5 mN in the machine direction.

13. The method of claim 1 wherein the label further comprises a print layer between the heat shrinkable film and the adhesive layer, wherein the heat shrinkable film is transparent.

14. The method of claim 1 wherein the label further comprises a print layer on the outer surface of the heat shrinkable film.

15. The method of claim 14 wherein the label further comprises a protective layer overlying the print layer.

16. The method of claim 1 wherein the adhesive layer comprises an emulsion adhesive.

17. The method of claim 1 wherein the adhesive layer comprises a hot melt adhesive.

18. The method of claim 1 wherein the adhesive layer comprises a solvent based adhesive.

19. The method of claim 1 wherein the heat shrinkable film has a machine direction and a transverse direction, the film having an ultimate shrinkage S in at least one direction of at least 10% at 90° C., wherein the shrinkage in the other direction is S±10%.

20. The method of claim 1 further comprising heating the label subsequent to the simultaneous application of heat and pressure to the label by the hot air knife assembly.

* * * * *